United States Patent
McCarry (12)

(10) Patent No.: US 10,268,536 B2
(45) Date of Patent: Apr. 23, 2019

(54) SECURE DEBUGGING WITH AN ENCRYPTED TOKEN

(71) Applicant: Oracle International Corporation, Redwood Shores, CA (US)

(72) Inventor: Frank McCarry, Ballycastle (GB)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 209 days.

(21) Appl. No.: 15/364,991

(22) Filed: Nov. 30, 2016

(65) Prior Publication Data

US 2018/0150349 A1   May 31, 2018

(51) Int. Cl.
G06F 11/07   (2006.01)
G06F 21/60   (2013.01)
G06F 21/62   (2013.01)

(52) U.S. Cl.
CPC ...... *G06F 11/0793* (2013.01); *G06F 11/0721* (2013.01); *G06F 21/602* (2013.01); *G06F 21/6218* (2013.01)

(58) Field of Classification Search
CPC ............... G06F 11/362; G06F 11/0793; G06F 11/0721; G06F 21/602
See application file for complete search history.

(56) References Cited

U.S. PATENT DOCUMENTS

| | | |
|---|---|---|
| 6,115,718 A | 9/2000 | Huberman et al. |
| 6,408,290 B1 | 6/2002 | Thiesson et al. |
| 6,430,305 B1 | 8/2002 | Decker |
| 6,496,816 B1 | 12/2002 | Thiesson et al. |
| 6,529,891 B1 | 3/2003 | Heckerman |
| 6,553,352 B2 | 4/2003 | Delurgio et al. |
| 6,779,119 B1 | 8/2004 | Moshfeghi et al. |
| 6,801,909 B2 | 10/2004 | Delgado et al. |
| 6,836,773 B2 | 12/2004 | Tamayo et al. |
| 6,895,398 B2 | 5/2005 | Evans-Beauchamp et al. |
| 7,113,917 B2 | 9/2006 | Jacobi et al. |
| 7,328,201 B2 | 2/2008 | D'Ambrosio |
| 7,499,948 B2 | 3/2009 | Smith et al. |
| 7,673,180 B1 * | 3/2010 | Chen ..................... G06F 11/362 714/38.11 |
| 7,870,084 B2 | 1/2011 | D'Ambrosio |

(Continued)

OTHER PUBLICATIONS

EStara, "Rules-Based Triggers FAQ," Copyright 2007.

(Continued)

*Primary Examiner* — Yolanda L Wilson
(74) *Attorney, Agent, or Firm* — Potomac Law Group, PLLC (57) ABSTRACT

Systems and methods for debugging dynamically rendered content are described herein. A plurality of rules are defined and stored, wherein each rule includes a condition and an action, and wherein each action includes an instruction to render content within a webpage. A rule object is generated based on the plurality of rules, wherein the rule object includes executable code. The rule object is stored within an in-memory device disposed between a rules server and a transformation server. An error is detected during the execution of the rule object. In response to a user request, an encrypted security token is generated to access one or more rule debugging modules of the rules server.

20 Claims, 8 Drawing Sheets

(56) References Cited

U.S. PATENT DOCUMENTS

| | | | |
|---|---|---|---|
| 9,003,309 B1* | 4/2015 | Venkateshamurthy | ................... G06F 17/30905 715/760 |
| 9,165,291 B1* | 10/2015 | Andersen | ............... G06Q 20/10 |
| 2001/0014868 A1 | 8/2001 | Herz et al. | |
| 2001/0021914 A1 | 9/2001 | Jacobi et al. | |
| 2002/0062245 A1 | 5/2002 | Niu et al. | |
| 2005/0209903 A1 | 9/2005 | Hunter et al. | |
| 2006/0179421 A1 | 8/2006 | Bielski et al. | |
| 2007/0233902 A1 | 10/2007 | Trefler et al. | |
| 2008/0208785 A1 | 8/2008 | Trefler et al. | |
| 2009/0125469 A1 | 5/2009 | McDonald et al. | |
| 2009/0132232 A1 | 5/2009 | Trefler | |
| 2009/0240531 A1 | 9/2009 | Hilborn | |
| 2010/0077216 A1* | 3/2010 | Kramer | ................... H04L 9/002 713/172 |
| 2010/0125757 A1* | 5/2010 | Lee | ..................... G06F 11/0709 714/38.1 |
| 2010/0125762 A1 | 5/2010 | Nie et al. | |
| 2011/0137832 A1 | 6/2011 | D'Ambrosio | |
| 2012/0290974 A1 | 11/2012 | Doig et al. | |
| 2012/0303490 A1* | 11/2012 | Hill | ........................ G06Q 30/00 705/27.2 |
| 2013/0080874 A1* | 3/2013 | Coleman | ........... G06F 17/30893 715/234 |

OTHER PUBLICATIONS

LivePerson, "LiveAlerts," http://solutions.liveperson.com/help/livealert.asp (last visited Aug. 22, 2011).

LivePerson, "Creating Rules to Automatically Capture Visit Information," http://base.liveperson.net/hc/s-5296924/cmd/kbresource/kb-6343261275199944167/view_question!PAGETYPE?sc=4582&sf=101133&documentid=397902&action=view (last visited Aug. 22, 2011).

Akamai, "Advanced Cache Control," http://www.akamai.com/dl/featuere_sheets/fs_edgesuite_adv_cachecontrol.pdf (last visited Aug. 22, 2011).

University of Pennsylvania, "Caching Description," http://www.upenn.edu/computing/web/central-host/caching/caching-description.html (last visited Aug. 22, 2011).

Greenspan, H., et al., "Learning Texture Discrimination Rules in a Multiresolution System," IEEE Transactions on Pattern Analysis and Machine Intelligence, vol. 16, No. 9, pp. 894-901, Sep. 1994.

D'Ambrosio B. et al., "Probabilistic Relational Models of On-line User Behavior: Early Explorations," Proceedings of the Fifth WEBKDD workshop; Webmining as a Premise to Effective and Intelligent Web Applications (WEBKDD'2003), in conjunction with ACM SIGKDD conference, Washington, DC, USA Aug. 27, 2003, pp. 9-16.

* cited by examiner

SECURE DEBUGGING WITH AN ENCRYPTED TOKEN

FIELD

The embodiments of the present invention generally relate to client webpages and, more particularly, to debugging of client webpages.

BACKGROUND

As Internet commerce continues to expand, websites continue to display increasing amounts of information and grow in complexity. In addition, websites may assemble a variety of webpages from multiple backend data sources using business logic contained in rule sets. Unaware of the backend data sources, the end-user typically navigates within a web browser to a variety of webpages, each webpage including content that can be displayed within the browser. The content of each webpage is generally controlled and rendered by the website owner. In some instances, the webpage may be linked to content generated by a third-party provider. For example, the webpage can include an advertisement banner of a webpage owned by the third-party. Thus, the webpage can cause content to be displayed within the browser that is generated by a variety of third-party providers, in addition to content that is generated by the webpage owner.

During the dynamic rendering of websites, efficient information retrieval from backend databases and rules systems remains an increasingly challenging problem. Queries to backend databases and rule execution can be expensive in terms of processing time. In addition, processing errors occasionally occur. Backend data sources and rules systems typically support webpages for multiple customers, and the existing debugging services do not adequately secure each company's data. As a result, the existing debugging services occasionally allow a company to view the rule sets of their competitors.

SUMMARY

The embodiments of the present invention are generally directed to systems and methods for secure debugging of client webpages using encrypted tokens that substantially improve upon the related art.

Features and advantages of the embodiments are set forth in the description which follows, or will be apparent from the description, or may be learned by practice of the invention.

For example, the embodiments are generally directed toward systems and methods for secure debugging of client webpages using encrypted tokens are described herein. A plurality of rules are defined and stored, wherein each rule includes a condition and an action, and wherein each action includes an instruction to render content within a webpage. A rule object is generated based on the plurality of rules, wherein the rule object includes executable code. The rule object is stored within an in-memory device disposed between a rules server and a transformation server. An error is detected during the execution of the rule object. In response to a user request, an encrypted security token is generated to access one or more rule debugging modules of the rules server.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

With some known website debugging systems, multiple customers may use the services of a single rules system having a single debugging service. Occasionally, errors occur during the execution of one or more rules. In the various embodiments, an encrypted token is introduced to the debugging service. Using the encrypted token, the rules system is secured so that customers cannot view the rule sets and business logic of other entities. In the various embodiments, the encrypted token may be encapsulated with a JavaScript that wraps the encrypted token so that it can be used as a sharable Internet cookie. When the user of the customer navigates between webpages, the encrypted token may be checked to ensure that the user does not navigate to another customer's webpage.

Reference will now be made in detail to the embodiments of the present invention, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments. Wherever possible, like reference numbers will be used for like elements.

In the various embodiments, user interfaces and associated methods for using an electronic device are described. In some embodiments, the electronic device is a portable communication device such as a mobile phone, smartphone, tablet, and the like. The user interface may include a touchscreen and/or other input/output devices. It should be understood, however, that the user interfaces and associated methods may be applied to other devices, such as personal computers, laptops, and the like which may include one or more other physical user-interface devices, such as a keyboard and or mouse.

The electronic device may support a variety of applications, such as Internet browser, text messenger, experience management, and various other applications. The various applications that may be executed on the electronic device may use at least one common physical user-interface device. In addition, a common physical architecture of the electronic device may support a variety of applications with user interfaces that are intuitive and transparent. In the discussion that follows, the secure debugging modules are used as an example embodiment, but it should be understood that the user interfaces and associated methods of the secure debugging modules may be readily applied to other applications.

Figure 1:
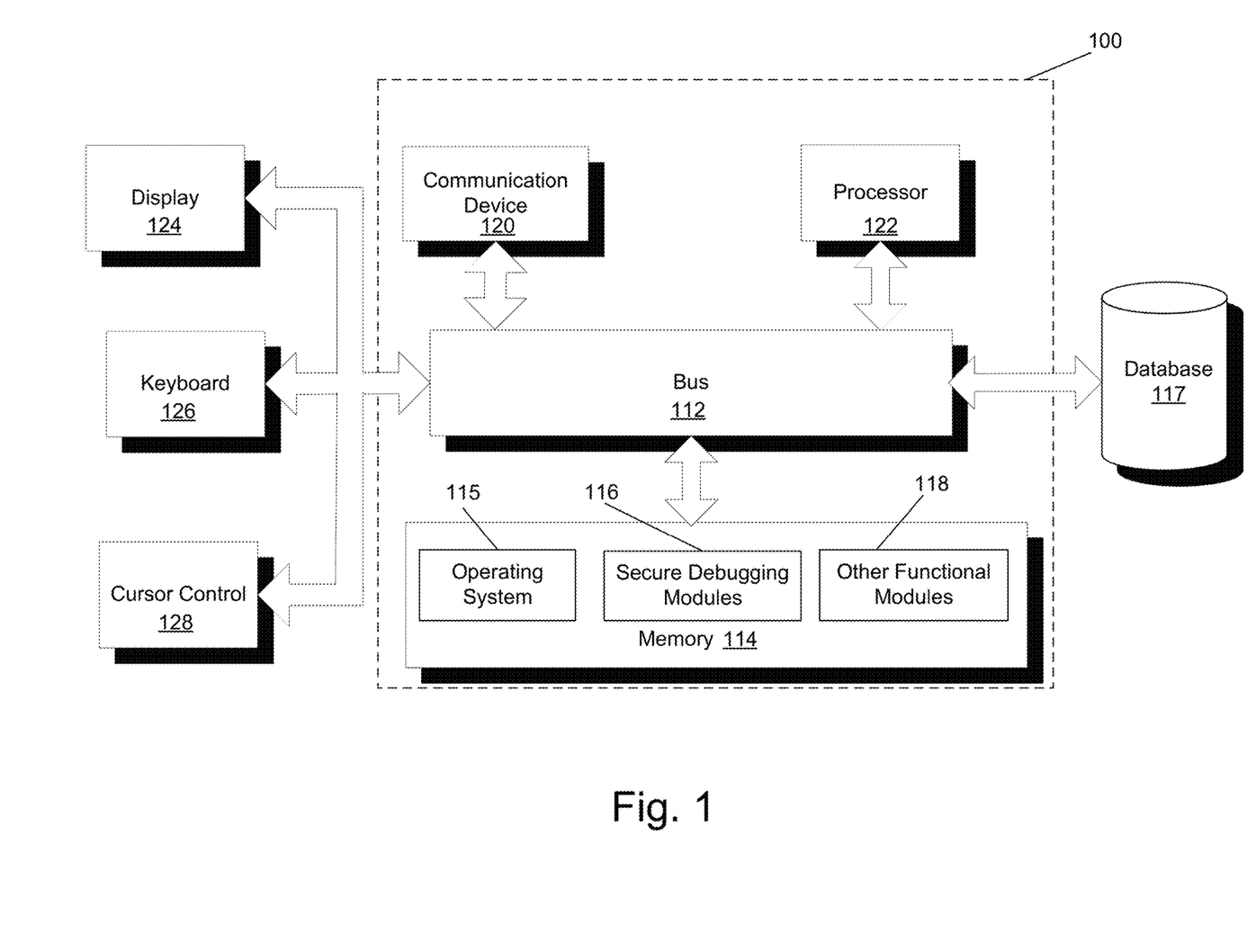
FIG. 1 illustrates a block diagram of a rules system according to an example embodiment of the invention.

FIG. 1 is a block diagram of a computer server/system 100 in accordance with an example embodiment of the present invention.

As shown in FIG. 1, rules system 100 may include a bus device 112 and/or other communication mechanism(s) configured to communicate information between the various components of rules system 100, such as processor 122 and memory 114. In addition, communication device 120 may enable connectivity between processor 122 and other devices by encoding data to be sent from processor 122 to another device over a network (not shown) and decoding data received from another system over the network for processor 122.

For example, communication device 120 may include a network interface card that is configured to provide wireless network communications. A variety of wireless communication techniques may be used including infrared, radio, Bluetooth, Wi-Fi, and/or cellular communications. Alternatively, communication device 120 may be configured to provide wired network connection(s), such as an Ethernet connection.

Processor 122 may include one or more general or specific purpose processors to perform computation and control functions of rules system 100. Processor 122 may include a single integrated circuit, such as a micro-processing device, or may include multiple integrated circuit devices and/or circuit boards working in cooperation to accomplish the functions of processor 122. In addition, processor 122 may execute computer programs, such as operating system 115, secure debugging modules 116, and other applications 118, stored within memory 114.

Rules system 100 may include memory 114 for storing information and instructions for execution by processor 122. Memory 114 may contain various components for retrieving, presenting, modifying, and storing data. For example, memory 114 may store software modules that provide functionality when executed by processor 122. The modules may include an operating system 115 that provides operating system functionality for rules system 100. The modules can include an operating system 115, secure debugging modules 116 configured to control and define rule script execution using one or more security tokens, as well as other functional modules 118. In some instances, secure debugging modules 116 may visually show the state of rules executing within a webpage of the company's website. Operating system 115 provides operating system functionality for rules system 100. Secure debugging modules 116 may include one or more application program interfaces ("API") that enable users to monitor the execution of rules and to add, modify, and/or remove rules used to dynamically generate content on webpages. In some instances, secure debugging modules 116 may be implemented as an in-memory configuration that is used to modify and execute rule scripts that control content displayed within a webpage, as will be described in more detail below.

Non-transitory memory 114 may include a variety of computer-readable medium that may be accessed by processor 122. For example, memory 114 may include any combination of random access memory ("RAM"), dynamic RAM ("DRAM"), static RAM ("SRAM"), read only memory ("ROM"), flash memory, cache memory, and/or any other type of non-transitory computer-readable medium.

Although shown as a single system, the functionality of rules system 100 may be implemented as a distributed system. For example, memory 114 and processor 122 may be distributed across multiple different computers that collectively comprise rules system 100. In one embodiment, rules system 100 may be part of a device (e.g., smartphone, tablet, computer, etc.), and rules system 100 may provide manipulation of dynamically render content of webpages. In another embodiment, rules system 100 may be separate from the device, and may remotely provide the aforementioned functionality for the device. Further, one or more component of rules system 100 may not be included. For example, for functionality of a user client, rules system 100 may be a smartphone that includes a processor, memory, and a display, but may not include one or more of the other components shown in FIG. 1.

Processor 122 is further coupled via bus 112 to a display 124, such as a Liquid Crystal Display ("LCD"). A keyboard 126 and a cursor control device 128, such as a computer mouse, are further coupled to communication device 112 to enable a user to interface with rules system 100.

Rules system 100 can be part of a larger system. Therefore, rules system 100 can include one or more additional functional modules 118 to include the additional functionality. Other functional modules 118 may include the various modules of the engagement engine ("EE") embedded in Oracle Cloud, for example. In another example, the EE rules system may be used to generate rules that utilize conditional facts to evaluate one or more rules from various sources (e.g., a customer catalog or visitor profile data) that may be accessed through "Exadata Express" FROM Oracle Corp. A database 117 is coupled to bus 112 to provide centralized storage for modules 116 and 118 and to store user profiles, transactions history, etc. In addition, database 117 may store customized rule sets to statically or dynamically generate webpage content. For dynamically generated webpages, one or more rules or rule sets may be used. For example, the content may be determined based on an end user profile, end user location, the type of browser utilized by the end user, how many times the end user has navigated to the current webpage, or which webpages of the website the end-user has viewed. Each company may have different rule sets. Some example rule sets may include rules for defining advertisements, discounts, e-mails to existing and/or potential customers, live chat/call with active customers, etc. Database 117 can store data in an integrated collection of logically-related records or files. Database 117 can be an operational database, an analytical database, a data warehouse, a distributed database, an end-user database, an external database, a navigational database, an in-memory database, a document-oriented database, a real-time database, a relational database, an object-oriented database, or any other database known in the art.

Known systems for controlling webpage content have a number of drawbacks. For example, prior systems require frequent reloading of rules scripts and updated rules scripts and generally do not enable the secure debugging of rule scripts. In these known configurations, multiple customers or entities utilize the services of a single rules system having a single debugging service. When an error occurs during the execution of one or more rules, security concerns arise. For example, a company utilizing a prior debugging service may inadvertently or deliberately retrieve the rule sets (i.e., business logic) of their competitors. To overcome the problems associated with unsecured rules, rules system 100 and secure debugging modules 116 introduce an encrypted security token to the debugging service. Using the encrypted security token, rules system 100 is secured so that customers cannot view the rule sets and business logic of other entities. In other words, the encrypted security token allows customers to debug their published rules on a single browser without compromising their intelligent business logic by exposing it to other customers or the general public.

Figure 2:
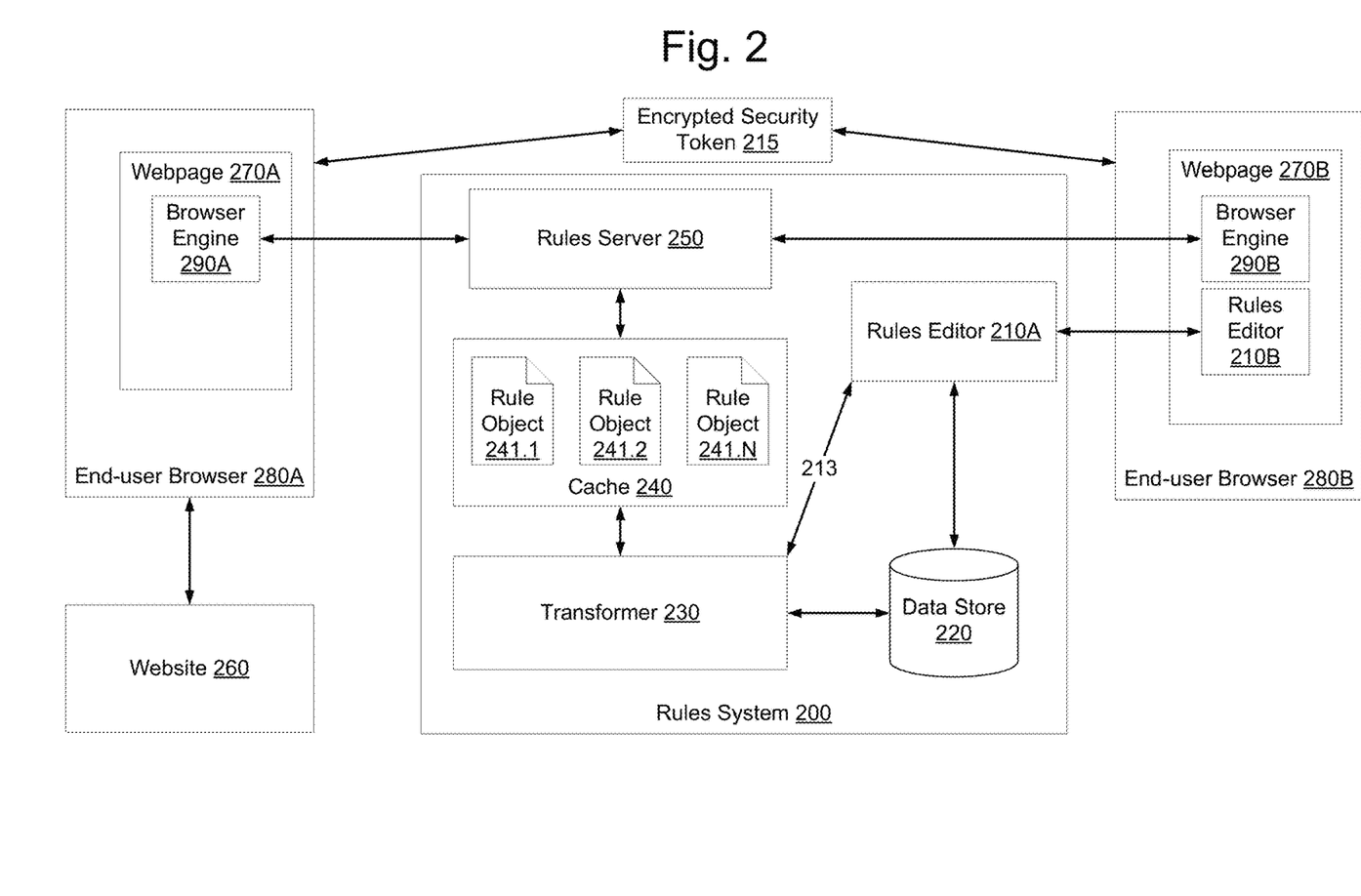
FIG. 2 illustrates a block diagram of a website operatively coupled to a rules system according to an example embodiment of the invention.

FIG. 2 illustrates a block diagram of a website operatively coupled to a rules system 200 according to an example embodiment of the invention.

As shown in FIG. 2, rules system 200 includes rules editor 210A. Rules editor 210A is a web-based editor that enables a user, such as a debugging end user of rules system 200 to retrieve an encrypted security token 215 and to define one or more rules. For example, rules editor 210A may display or otherwise provide a user interface (e.g., a web browser, proprietary interface, and/or other interface) that enables the user to define one or more rules. Defining one or more rules may include generating, modifying, and/or deleting one or more rules, or any combination thereof. The defining of the rules further includes the determining of one or more conditions and/or one or more related actions for the rule. Actions that are associated with various rules may control the operation of webpages that are operatively coupled to rules system 200. For example, an action may control a display of content within webpages 270A, 270B operatively coupled to rules system 200. A condition is generally data that can be verified. Thus, a rule is a collection of one or more conditions, and/or one or more corresponding actions, where the rule can be composed by the user and stored in a tangible medium, such as data store 220.

Rules system 200 includes data store 220, and rules defined by rules editor 210A are stored within data store 220. Data store 220 can be any type of data storage device. For example, data store 220 can be a database (e.g., database 117), such as a relational database, and/or in-memory database. In another example, data store 220 can be a file, and/or a file system that includes a plurality of files. In some instances, the rules stored within data store 220 can be organized into one or more rule sets.

Rules stored within data store 220 are not immediately accessible by the other components of rule system 200. Instead, rules are deployed before becoming accessible by the other components of rule system 200. The deployment of rules may include the transformation of the rules stored within data store 220 to rule objects 241.1-241.N stored within cache 240, such as an in-memory cache or in-memory data grid (e.g., "Coherence" from Oracle Corp.). In addition, deployed rules may be debugged without altering the state of rules system 200.

Rules system 200 also may include a transformer 230. Rules editor 210A can transmit a deployment command 213 to transformer 230, where deployment command 213 includes instructions to deploy one or more rules retrieved from data store 220. In some instances, deployment command 213 may include a filter that can be applied to the rules stored within data store 220. For example, deployment command 213 can include instructions to deploy one or more rules associated with a specific website. In this example, the one or more rules associated with a specific website may be organized as a rule set.

Upon receiving deployment command 213, transformer 230 accesses data store 220 and retrieves one or more rules from data store 220 based on deployment command 213. According to an embodiment, deployment command 213 includes a filter, and transformer 230 can apply the filter to data store 220. More specifically, transformer 230 can filter the rules that are retrieved from data store 220 so that only the rules that satisfy the filter associated with deployment command 213 are returned.

Upon retrieving the rules from data store 220, transformer 230 generates one or more rule objects 241.1-241.N, such as rule scripts, based on the rules retrieved from data store 220. Rule objects 241.1-241.N are stored in cache 240. In one embodiment, transformer 230 may generate rule objects 241.1-241.N that correspond to each website that is operatively coupled to rules system 200. Here, each website may be defined using a request attribute, where the defined request attribute is stored within data store 220. The request attribute may be a uniform resource locator ("URL") attribute or hypertext markup language ("HTML") tag.

The storage of rule objects 241.1-241.N within cache 240 enables rule publication in real-time or substantially real-time. As a result, rules server 250 does not require notification of a publish event. Instead, rules server 250 may retrieve, on-demand, the latest rule objects 241.1-241.N from data cache 240. Accordingly, the use of cache 240 ensures that rule objects 241.1-241.N are less error prone, but some errors occur nevertheless.

In some embodiments, transformer 230 generates rule objects 241.1-241.N by generating executable code for each rule selected from data store 220 and storing the executable code within a rule object. Thus, each rule object 241.1-241.N may include executable code. Transformer 230 can generate executable code in any of a variety of programming languages, such as Java®, JavaScript, C, C++, or Lua. The executable code may be pre-compiled, or compiled on the fly by compiler modules accessible by transformer 230.

In some embodiments, transformer 230 generates rule objects 241.1-241.N using synthetic variable rule scripts as described in U.S. Pat. No. 8,046,315, entitled "RELATIONAL BAYESIAN MODELING FOR ELECTRONIC COMMERCE," the contents of which are incorporated by reference herein. A synthetic variable scripting language is a scripting language for constructing synthetic variables, where a synthetic variable comprises a chain of elements (i.e., an expression), where an element comprises a set of selection phrases, and where each element serves as a mapping from input data to output data. The synthetic variables can be constructed based on a synthetic grammar. A synthetic variable scripting language can utilize extensible markup language ("XML") files to construct the synthetic variables, and the synthetic variable scripting language can be used to create synthetic variable rule scripts that have a highly optimized runtime. In order to modify a synthetic variable rule script, an XML file of a synthetic variable rule script can be modified.

Rules system 200 also includes rules server 250. For example, rules server 250 may be a multi-tenant software as a service ("SAAS") solution that is a single stack supporting multiple customers. Rules server 250 is configured to access rule objects 241.1-241.N within cache 240. Rules server 250 may retrieve rule objects 241.1-241.N according to a hypertext transfer protocol ("HTTP") and/or other request mechanism. Rule objects 241.1-241.N become available once cache 240 is activated. Rules server 250 may rely upon cache 240 for storage and retrieval of rule objects 241.1-241.N. In addition, rules server 250 does not directly access data store 220 in order to load a rule script, such as those encapsulated within rule objects 241.1-241.N. As a result, rule objects 241.1-241.N may be rapidly executed by rules server 250. Furthermore, by generating executable code that comprises rule objects 241.1-241.N during deployment of the rule, rather than during runtime execution of the rule scripts, the processing time associated with rule objects 241.1-241.N can be greatly reduced. Accordingly, the overall performance of rules system 200 is improved relative to known solutions. In addition, as rule objects 241.1-241.N are stored within cache 240, they do not have to be held within rules server 250, further improving memory management for rules server 250. As rules server 250 retrieves rule objects 241.1-241.N from cache 240, rules server 250 publishes the most recent versions of rule objects 241.1-241.N.

Rules system 200 is operatively coupled to website 260 which is a collection of one or more webpages. Website 260 can receive a request from web browser 280A, 280B, and can transmit the requested webpage to web browser 280A, 280B of the end user. In some instances, the request from the web browser may be an HTTP request. In the illustrated embodiment of FIG. 2, website 260 provides the content of webpage 270A, 270B within web browser 280A, 280B. Webpage 270A, 270B is a webpage that is a part of website 260. Webpage 270A, 270B displays content based on rule objects 241.1-241.N of rules system 200.

End-user browser 280A, 280B is a web browser utilized by the end-user. End-user browser 280A, 280B is configured to render webpages, such as webpage 270A, 280B. In one embodiment, end-user browser 280 can be Microsoft Internet Explorer®, Google Chrome®, Apple Safari®, or any other commercially available browser.

According to the various embodiments, webpage 270A, 270B includes a reference to rules system 200. For example, the reference to rules system 200 may be a JavaScript reference or a reference of another programming language. Regardless of the programming language used, the reference to rules system 200 includes an identifier that uniquely identifies website 260. As an example, the identifier may be an account number associated with website 260. However, in other examples, the identifier can be anything that uniquely identifies website 260, such as a sequence of numbers, a sequence of characters, or a combination therein.

End-user browser 280A, 280B subsequently transmits a request for browser engine 290A, 290B. Browser engine 290A, 290B is a static scripting language file that contains executable code that can be executed by end-user browser 280. The executable code contained within browser engine 290A, 290B can control an operation of webpage 270A, 270B. For example, the executable code contained within browser engine 290A, 290B can control a display of content within webpage 270A, 270B. In one embodiment, browser engine 290A, 290B is a static JavaScript file which is cached by the end user. However, in alternate embodiments, browser engine can be a static file written in any scripting language.

In one embodiment, end-user browser 280 transmits the request for browser engine 290A, 290B to rules system 200. In response, rules system 200 transmits browser engine 290A, 290B to end-user browser 280. In another embodiment, end-user browser 280 may transmit the request for browser engine 290A, 290B to website 260, and may receive browser engine 290A, 290B from website 260. In yet another embodiment, browser engine 290A, 290B may transmit the request for browser engine 290A, 290B to an edge cache server, and receive browser engine 290A, 290B from the edge cache server as is described below in greater detail in relation to FIG. 3.

In operation, end-user browser 280 may be configured to execute the executable code contained within browser engine 290A, 290B. When the executable code requires data from rules system 200, browser engine 290A, 290B can transmit a request to rules server 250 of rules system 200. For example, the executable code can require data from rules system 200 when the executable code is required to apply one or more rules to control an operation of webpage 270A, 270B, such as controlling a display of content within webpage 270A, 270B. In certain embodiments, the request transmitted by browser engine 290A, 290B can include a request attribute. In one embodiment, the request attribute is a URL attribute. In other embodiments, the request transmitted by browser engine 290A, 290B can include an identifier that uniquely identifies website 260. In one embodiment, the identifier is an account number associated with website 260.

Rules server 250 receives the request transmitted by browser engine 290A, 290B. Rules server 250 subsequently selects one or more rule objects 241.1-241.N from cache 240 based on the received request. In one embodiment, rules server 250 selects rule objects 241.1-241.N based on a request attribute included within the received request. Here, rules server 250 selects each rule script associated with a request attribute that matches the request attribute included within the received request. In an alternate embodiment, rules server 250 selects rule objects 241.1-241.N based on an identifier included within the received request. In this instance, rules server 250 selects each rule object associated with an identifier that matches the identifier included within the received request. In another embodiment, rules server 250 selects one or more rule objects 241.1-241.N based on a combination of a request attribute and an identifier included within the received request.

Subsequently, rules server 250 executes the selected rule objects 241.1-241.N. The execution of the selected rule objects 241.1-241.N involves the execution of the executable code that is stored within cache 240. If the executable code is of a compiled language, rules server 250 can create an instance of a compiled class that corresponds to each rule script of the selected one or more rule scripts.

The execution of the selected one or more rule scripts generates data. The data can be utilized by browser engine 290A, 290B to control an operation of webpage 270A, 270B, such as controlling a display of content within webpage 270A, 270B. For example, the data can include unevaluated conditions, evaluated conditions, and actions that correspond to either an unevaluated condition or an evaluated condition. The data can also include state information (i.e., information about a state of rules server 250). For each rule contained within each rule script, rules server 250 can evaluate as many conditions as possible within rules server 250, so that a size of the generated data is as small as possible. More specifically, in circumstances where rules server 250 can evaluate a condition of a rule and determine an action based on the evaluated condition, rules server 250 can generate data that includes an evaluated condition and a corresponding action, as opposed to generating all possible actions associated with the rule. However, in circumstances when rules server 250 cannot evaluate a condition of a rule, and the condition is required to be evaluated by browser engine 290A, 290B, rules server 250 can generate data that includes an unevaluated condition and all possible actions associated with the rule. Thus, by evaluating as many conditions as possible within rules server 250, a number of actions that are required to be generated can be reduced, which reduces an overall size of the data that is generated from the execution of the selected one or more rule scripts.

Once the data has been generated, rules server 250 transmits the data to browser engine 290A, 290B. In one embodiment, rules server 250 transmits the data by transmitting an XML document to browser engine 290A, 290B that includes the data. In another embodiment, rules server 250 transmits the data by transmitting one or more JavaScript object notation ("JSON") objects to browser engine 290A, 290B that includes the data. In some instances, JSON data may be metadata that determines which rules should be executed and how often. According to the embodiment, the data does not include executable code, and thus, rules server 250 does not transmit any executable code to browser engine 290A, 290B, in response to a request from browser engine 290A, 290B. Instead, the only executable code that rules server 250 transmits to end-user browser 280A, 280B is browser engine 290A, 290B. The absence of executable code within the data transmitted by rules server 250 to browser engine 290A, 290B can significantly reduce the size of the data that is transmitted. This can significantly reduce an overall processing time, and can increase overall performance. In addition, rules server 250 may remove as much data from the JSON/XML as possible by running as many rules as it can at the server. In other words, if the outcome of a rule can be calculated at rules server 250, the result is returned only as data, instead of returning both the rule definition and all data result. This improves client side performance by eliminating as many rules from the dataset as possible before transmission in the response.

In accordance with the embodiment, either of browser engines 290A, 290B utilizes the data received from rules server 250 to control an operation of webpage 270A, 270B. In one example embodiment, browser engine 290A, 290B utilizes the data received from rules server 250 to control a display of content within webpage 270A, 270B. For example, browser engine 290A, 290B utilizes the received data to display a web-based communication link, such as a click-to-call or click-to-chat communication link, within webpage 270A, 270B. According to the example, in a web-based communication, a user can click an object (such as a button, image, text, or other type of icon) displayed within webpage 270A, 270B to request an immediate connection with an individual, such as an agent. When the web-based communication is a click-to-call communication, the immediate connection may be a telephone connection. When the web-based communication is a click-to-chat communication, the immediate connection may be a web-based chat session.

Example end-user browser 280B differs from end-user browser 280A by further including rules editor 210B. After securely logging into the rules system 200, the end user may utilize rules editor 210B and rules editor 210A (of rules system 200) to generate an encrypted security token, such as encrypted security token 215. For example, rules editor 210A may supply encrypted security token 215 to rules editor 215B. By providing encryption/decryption functionality at rules system 200 (i.e., the server-side), security is enhanced. Using the copy and paste functions of the operating system (such as operating system 115 of FIG. 1), encrypted security token 215 can be shared between end-users of the customer. For example, encrypted security token 215 may be encapsulated with a JavaScript that wraps encrypted security token 215 as an Internet cookie. In some instances, encrypted security token 215 may be generated in response to a click of a button at end-user browser 280B, and pasted into another web browser's cookie folder, at end-user browser 280A, for example.

If the user of end-user browser 280A, 280B navigates between webpages, encrypted security token 215 may be checked to ensure that the user does not navigate to another customer's webpage. For example, encrypted security token 215 may be verified by rules server 250. Debugging data may be displayed within browser engine 290A, 290B. For example, debugging data may visually depict the running state of rules within end-user browser 280A, 290B. Such debugging data may highlight errors in business logic or unexpected behavior of rules. In addition to debugging data, condition and session (state) information of rules server may also be viewed and logged.

In the various embodiments, encrypted security token 215 identifies a customer's account within rules system 200 (e.g., using an account number), and further includes a time stamp. Using the account information, rules system 200 may verify that the user is entitled to view the rule sets associated with a particular website. Accordingly, customer A cannot debug customer B's rules by navigating to their website and trying to reuse a previously generated token. In addition, the time stamp of encrypted security token 215 is used to time limit the validity of the token. Encrypted security token 215 has a validity time period so it is only valid for a limited time. For example, encrypted security token 215 may be valid for a predetermined period of time beginning from the time stamp (e.g., 1 hour, 1 day, 1 week, etc.).

Example pseudocode for generating an encrypted security token 215 is shown below.

```
Method createToken(String eeld, int validityPeriod) {
    // Create the Cipher and Message Digest objects
    Cipher cipher = Cipher.getInstance(.... defines the AES (a block
cipher) for encryption in CBC mode with PKCS5 padding ...)
    // Create a timestamp defining the tokens expiry timestamp.
    long timestamp = currentTimeMillis + validityPeriod * 1000
    // Create byte array or timestamp + unique account id
    byte[ ] plaintext = new byte[timestampArr + idArr]
    // Encrypt it.
    byte[ ] ciphertext = cipher.doFinal(plaintext)
    // Prepend the HMAC. SHA1 is used as a HMAC to detect attempts
to modify the token
    Mac mac = Mac.getInstance( ... use a HMAC SHA1 algorithm...)
    // use a common salt on MAC
    mac.init(...system generated secret key...);
    // Get MAC from un ciphered text to ensure its not tampered with in
transit.
    byte[ ] hmac = mac.doFinal(plaintext)
    byte[ ] finalCiphertext = new byte[hmac +ciphertext]
    // Prepend the IV.
    byte[ ] iv = cipher.getIV( )
    byte[ ] finalBuffer = new byte[iv + finalCiphertext]
    return urlSafeEncode(finalBuffer)
}
```

In one embodiment, rules server 250 uses a stateful session to persist a user state for a current session in a memory of rules server 250. The user state can include such data as one or more webpages visited by the user, and one or more sessions conducted by the user. A session may include a series of user activities within a predetermined time period. For example, a session may begin with a first user request and end after 30 minutes of inactivity. The user state can be retrieved for each subsequent request and thus, the user state does not need to be rebuilt for each request. Furthermore, because the user state for the current session is persisted in the memory of rules server 250, rules server 250 is not required to persist the user state in one or more cookies stored within end-user browser 280. As rules objects 241.1-241.N are not stored within the sessions of rule server 250, but instead stored within cache 240, the memory management for rule server 250 is greatly improved as a result.

Rules server 250 can utilize load balancing to ensure requests from end-user browser 280A, 280B are transmitted to rules server 250. The user state can be retrieved from the memory of rules server 250 when a request from end-user browser 280A, 280B is received. Persisting the user state within the memory of rules server 250 can increase an overall performance of rules system 200, as less processing time is required to rebuild a user state. Furthermore, persisting the user state within the memory of rules server 250 can increase overall security, as the user state does not need to be transmitted to end-user browser 280A, 280B to be stored in one or more cookies. Finally, by storing rules objects 241.1-241.N separately within cache 240, the stateful session on rules server 250 may be limited to user state data. Thus, a larger user state can be persisted, which results in more data about the user being persisted.

Figure 3:
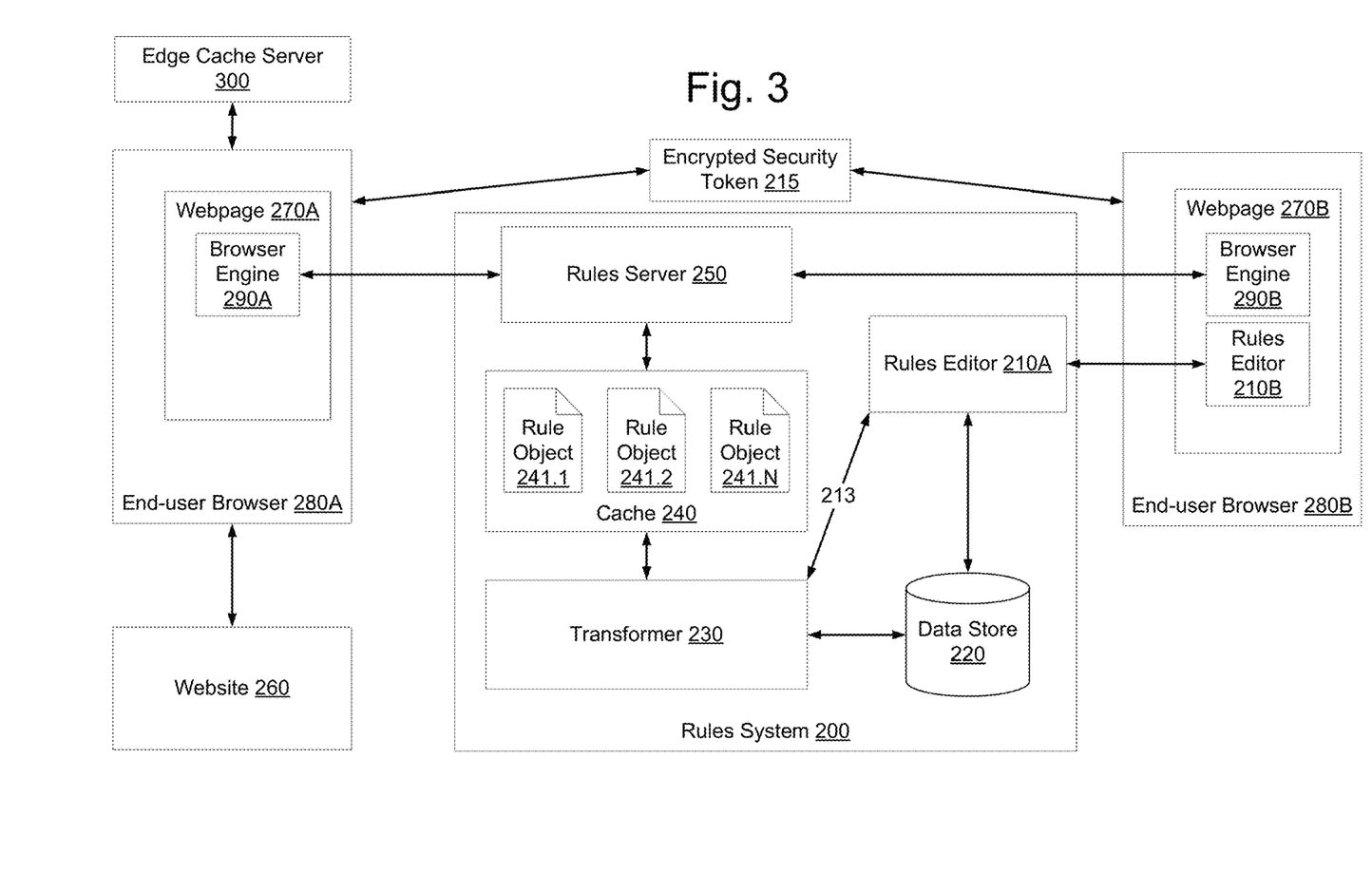
FIG. 3 illustrates a block diagram of a website operatively coupled to a rules system according to another example embodiment of the invention.

FIG. 3 illustrates a block diagram of a website operatively coupled to rules system 200 according to another example embodiment of the invention. The illustrated embodiment of FIG. 3 is similar to the illustrated embodiment of FIG. 2, and similar components that are described in relation to FIG. 2 are not described again in relation to FIG. 3. According to the embodiment, end-user browser 280A, 280B transmits the request for browser engine 290A to edge cache server 300, rather than rules server 250. Furthermore, end-user browser 280A, 280B receives browser engine 290A from edge cache server 300 rather than rules server 250. In some configurations, browser engine 280A, 280B may be a static JavaScript file that can be downloaded from edge cache server 300. Here, the JavaScript file is not customer specific, and the same JavaScript library is used by all customers.

An edge cache server, such as edge cache server 300, is a server configured to store a cached copy of one or more webpages, where a cached copy of a webpage is a copy of a webpage that is created and stored when the original webpage is first retrieved. This reduces the processing time for subsequent retrievals of the webpage. In one embodiment, edge cache server 300 can be an Akamai® edge cache server. By utilizing edge cache server 300, which can be located in a very close proximity to end-user browser 280A, browser engine 290A can be transmitted to end-user browser 280A very rapidly.

Figure 4:
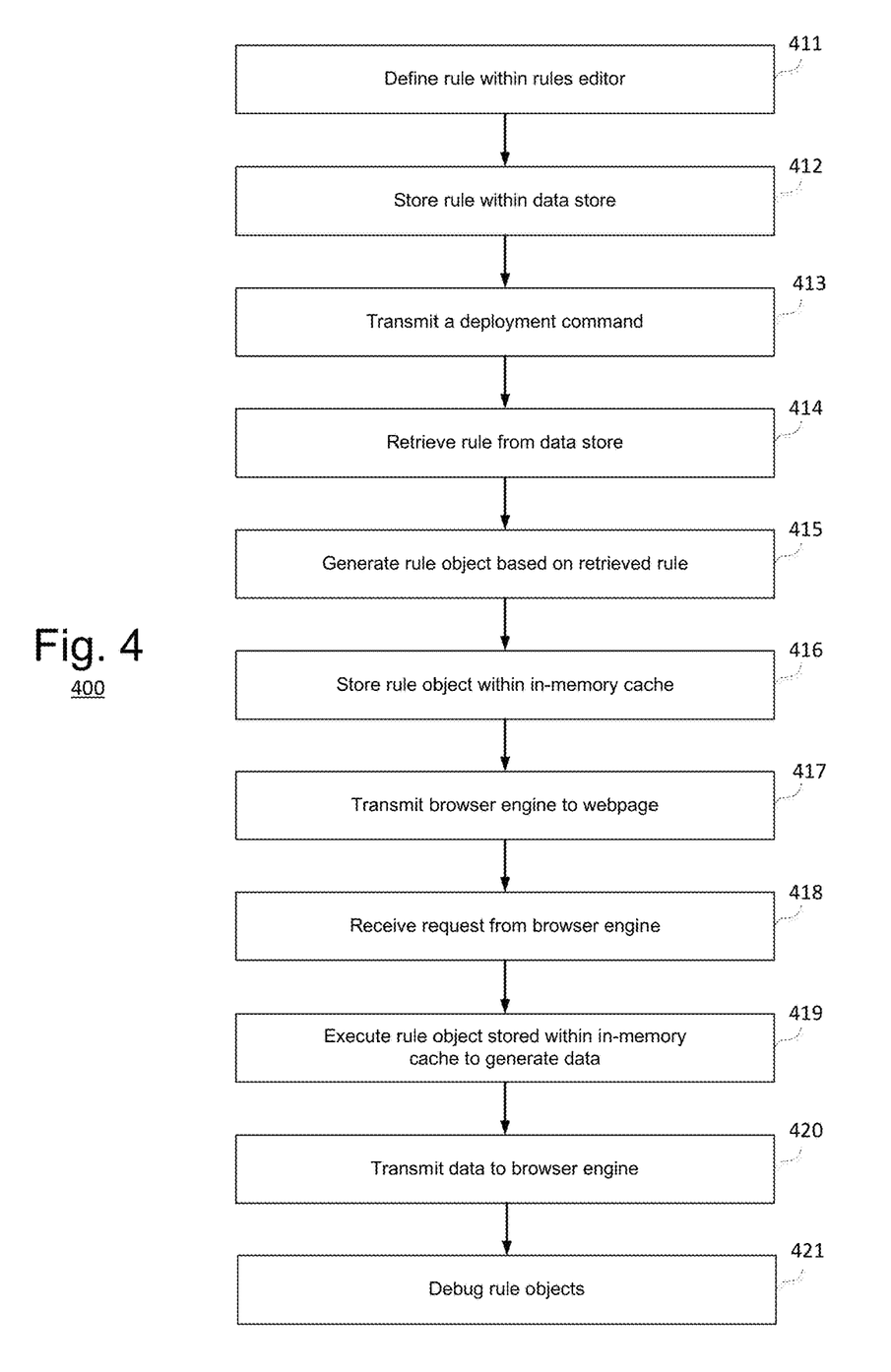
FIG. 4 illustrates a flow diagram of a rule script debugging module according to an example embodiment of the invention.

FIG. 4 illustrates a flow diagram 400 of a rule script secure debugging module according to an example embodiment of the invention. In one embodiment, the functionality of the flow diagram of FIG. 4, as well as the functionality of the flow diagram of FIG. 5, described below, is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At 411, a rule is defined within a rules editor (e.g., rules editor 210A, 210B). In one embodiment, the defining of the rule can include creating the rule within the rules editor. In another embodiment, the defining of the rule can include modifying the rule within the rules editor. The rules editor can display a user interface to a user within a web browser, and a user can interface with the rules editor using the user interface of the web browser to define a rule. The defining of the rule can include defining at least one condition and at least one related action for the rule. In one embodiment, an action for the rule can control a display of content within a webpage of a web site.

At 412, the rule is stored within a data store. In one embodiment, the rule is stored as part of a rule set that is also stored within the data store. In one embodiment, the data store can be a database, where the rule is stored as a record within the database. In another embodiment, the data store can be a file, where the rule is stored within the file. In yet another embodiment, the data store can be a file system that includes a plurality of files, where the rule is stored within a file of the plurality of files.

At 413, a deployment command is transmitted. The deployment command includes a command to deploy one or more rules stored within the data store. In one embodiment, the deployment command can also include a filter that can be applied to the one or more rules stored within the data store. As an example, the filter can indicate that only the rules associated with a website are to be deployed.

At 414, a rule is retrieved from the data store. In an embodiment where a deployment command includes a filter, the filter can be applied to the data store to only retrieve a rule that satisfies the filter.

At 415, a rule object is generated based on the rule that is retrieved from the data store. In one embodiment, a rule object is created by generating executable code for the rule that is retrieved from the data store and storing the executable code within a rule script. In one embodiment, a rule object that is generated corresponds to a website. The website is defined using a request attribute, where the defined request attribute is stored within the data store. In one embodiment, the executable code is of a compiled language. In another embodiment, the executable code is of a scripting language. Furthermore, in one embodiment, the rule script is a synthetic variable rule script, and the executable code is of a synthetic variable scripting language.

At 416, the rule script is stored within an in-memory cache. The storage of rule objects within the cache enables rule publication in real-time or substantially real-time. As a result, the rules server does not require notification of a publish event. Instead, the rules server may retrieve the latest rule objects from the data cache.

At 417, a browser engine is transmitted to a webpage. In one embodiment, the browser engine is a static scripting language file that contains executable code that can be executed by an end-user browser. The executable code contained within the browser engine can control an operation of the webpage, such as controlling a display of content within the webpage. In an alternate embodiment, an edge cache server can transmit the browser engine to the webpage.

At 418, a request is received from the browser engine. In one embodiment, the request is a request to receive data corresponding to a rule so that the rule can be applied to control an operation of the webpage, such as controlling a display of content within the webpage. Also in one embodiment, the request can include data. In one embodiment where the request includes data, the request includes a request attribute. In another embodiment where the request includes data, the request includes an identifier that uniquely identifies a website that the webpage is associated with.

At 419, the rule object is executed to generate data. The rule object is executed in response to the received request. In one embodiment, the execution of the rule script involves the execution of the executable code stored within the memory of the rules server.

At 420, the data is transmitted to the browser engine. In one embodiment, the data is transmitted by transmitting an XML document to the browser engine, where the XML document includes the data. In an alternate embodiment the data is transmitted by transmitting one or more JSON objects to the browser engine, where the one or more JSON objects include the data. According to the embodiment, the data does not include any executable code.

Lastly, at 421, an error is detected during the execution of the rule object. For example, the data intended to be generated by the rule object may not be transmitted to the browser engine contained within the webpage. Upon determining that an error has occurred, the user of the customer may request that the encrypted security token be generated. Using the generated encrypted security token, the user may access one or more debugging modules of the rules system.

Figure 5:
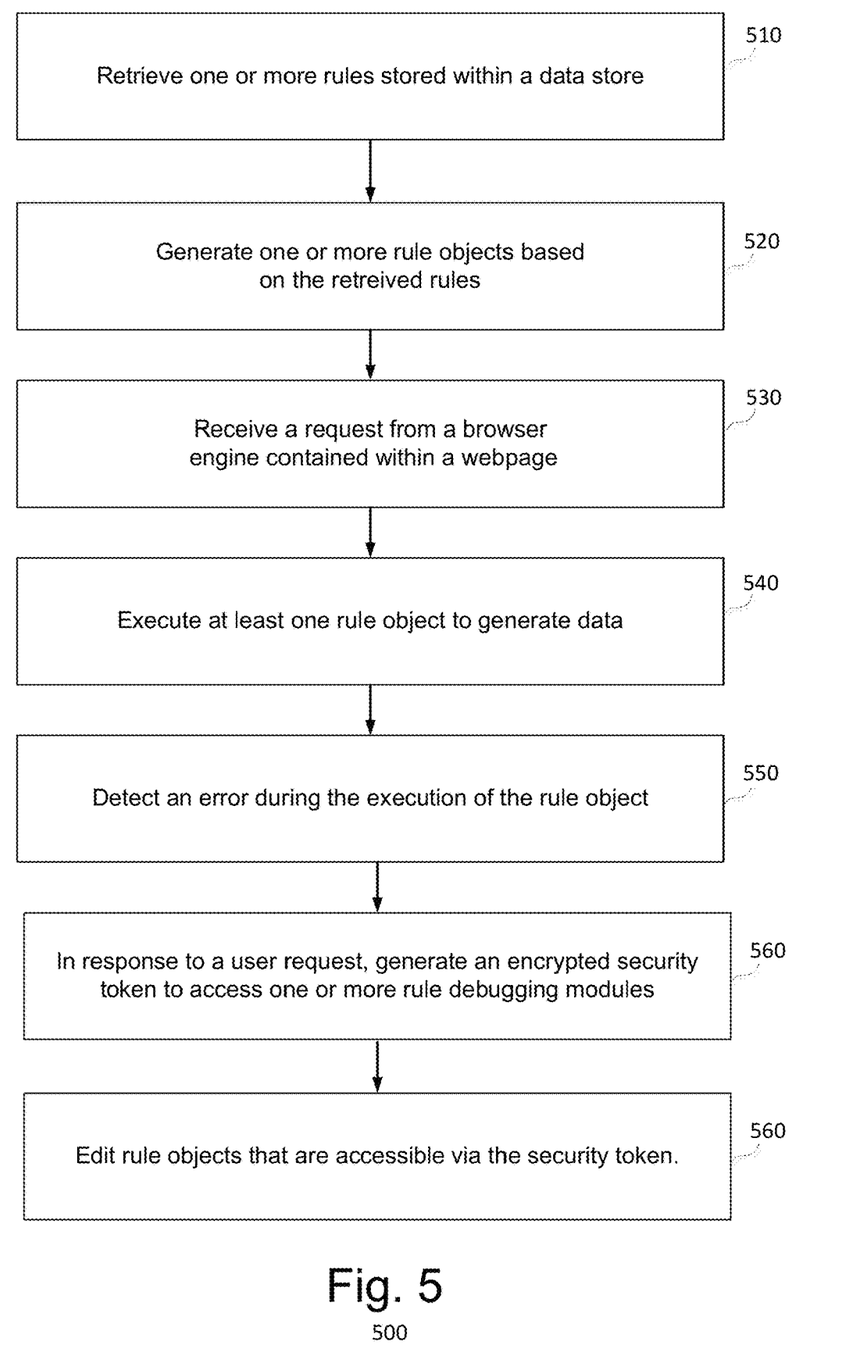
FIG. 5 illustrates another flow diagram of the functionality of a debugging module according to an example embodiment of the invention.

FIG. 5 illustrates another flow diagram 500 of the functionality of a rule secure debugging module according to an example embodiment of the invention. At 510, one or more rules that are stored within a data store are retrieved. Each rule includes one or more conditions and one or more actions, where each action includes an instruction to display content within the webpage. In one embodiment, a filter can be applied to the data store to only retrieve one or more rules that satisfy the filter.

At 520, one or more rule objects are generated based on the retrieved rules. In one embodiment, each rule script includes executable code. In an embodiment, the executable code is of a compiled language. In another embodiment, the executable code is of a scripting language. Furthermore, in one embodiment, each rule script is a synthetic variable rule script, and the executable code is of a synthetic variable scripting language. The generated rule objects may be stored within an in-memory cache.

At 530, a request is received from a browser engine contained within a webpage. In one embodiment, the request is a request to retrieve data corresponding to a rule so that the rule can be applied to control an operation of the webpage, such as controlling a display of content within the webpage. The request can include data. In one embodiment where the request includes data, the request includes a request attribute. In another embodiment where the request includes data, the request includes an identifier that uniquely identifies a website that the webpage is associated with.

At 540, at least one rule object is executed to generate data. The at least one rule script is executed in response to the received request. In one embodiment, the execution of the at least one rule script involves the execution of the executable code of the at least one rule script.

At 550, an error is detected during the execution of the rule object. For example, the data intended to be generated by the rule object may not be transmitted to the browser engine contained within the webpage. In addition to detecting errors during the execution of the rule object, the secure debugging modules may be configured to identify and evaluate unexpected system behavior. For example, if the 'click to chat' traffic has suddenly increased, the debugger may evaluate the rules running on the webpage to determine whether the rules that offers click to chat are running repeatedly, say, three times on the webpage when it should execute only once. In another example, the secure debugging modules may be used to determine why click to chat was not offered. Here, in evaluating the conditions on the rule via the debugger, the condition (e.g., IP Location, time on page, page title, page URL, etc.) that results in chat not being offered may be identified.

Upon determining that an error has occurred, the user of the customer may request that the encrypted security token be generated, at 560. Using the generated encrypted security token, the user may access one or more debugging modules of the rules system. Lastly, at 560, the user may add, remove, and/or otherwise modify the rule objects that are accessible via the encrypted security token.

Figure 6:
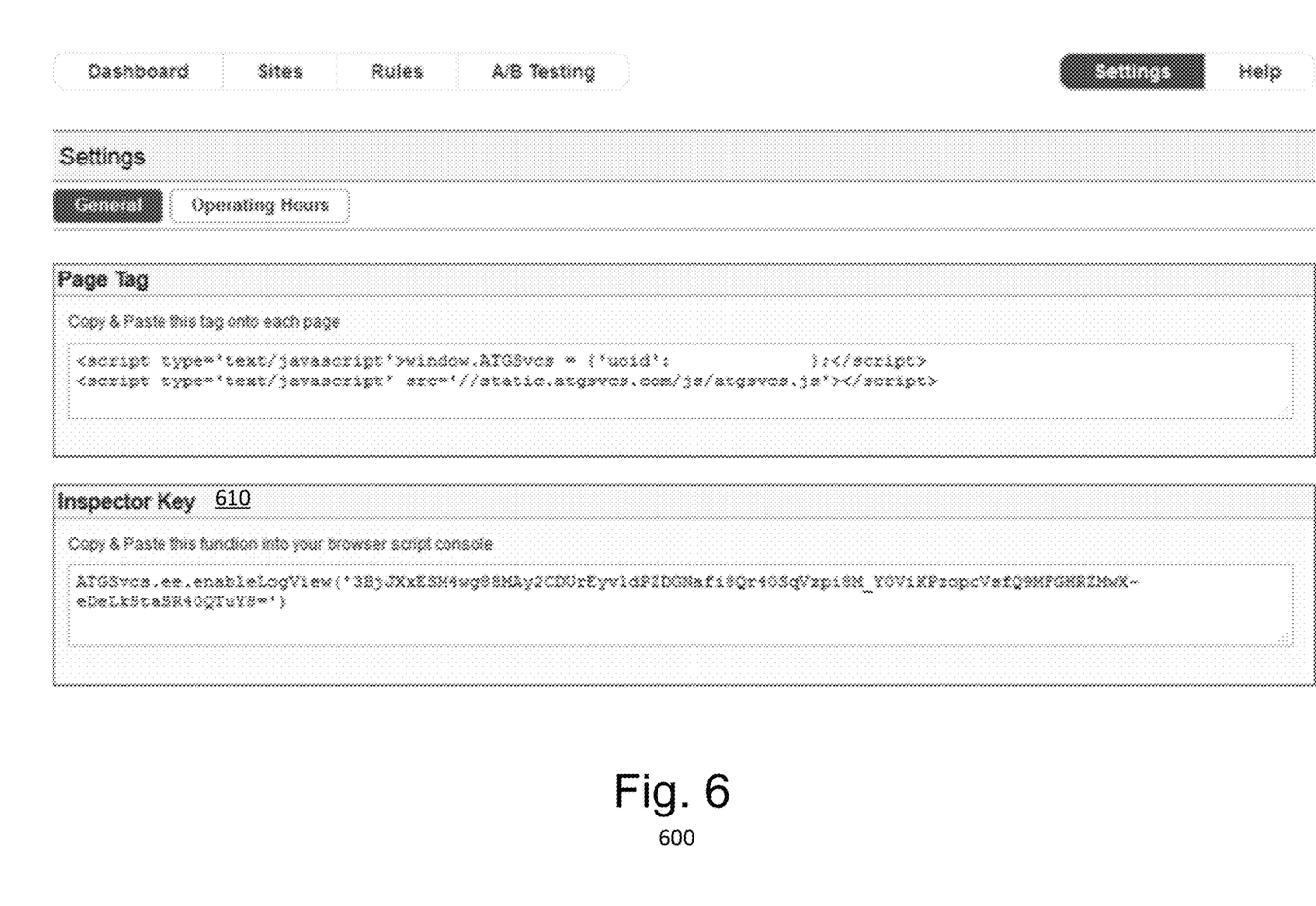
FIG. 6 illustrates an example graphical user interface of the debugging module according to an example embodiment of the present invention.

FIG. 6 illustrates an example graphical user interface 600 of the debugging module according to an example embodiment of the present invention. As shown in FIG. 6, the encrypted security token or debugging key may be accessed within section 610. The encrypted security token may be used to activate the secure debugging modules to provide real-time feedback about which rules are active and how they are being evaluated.

Figure 7:
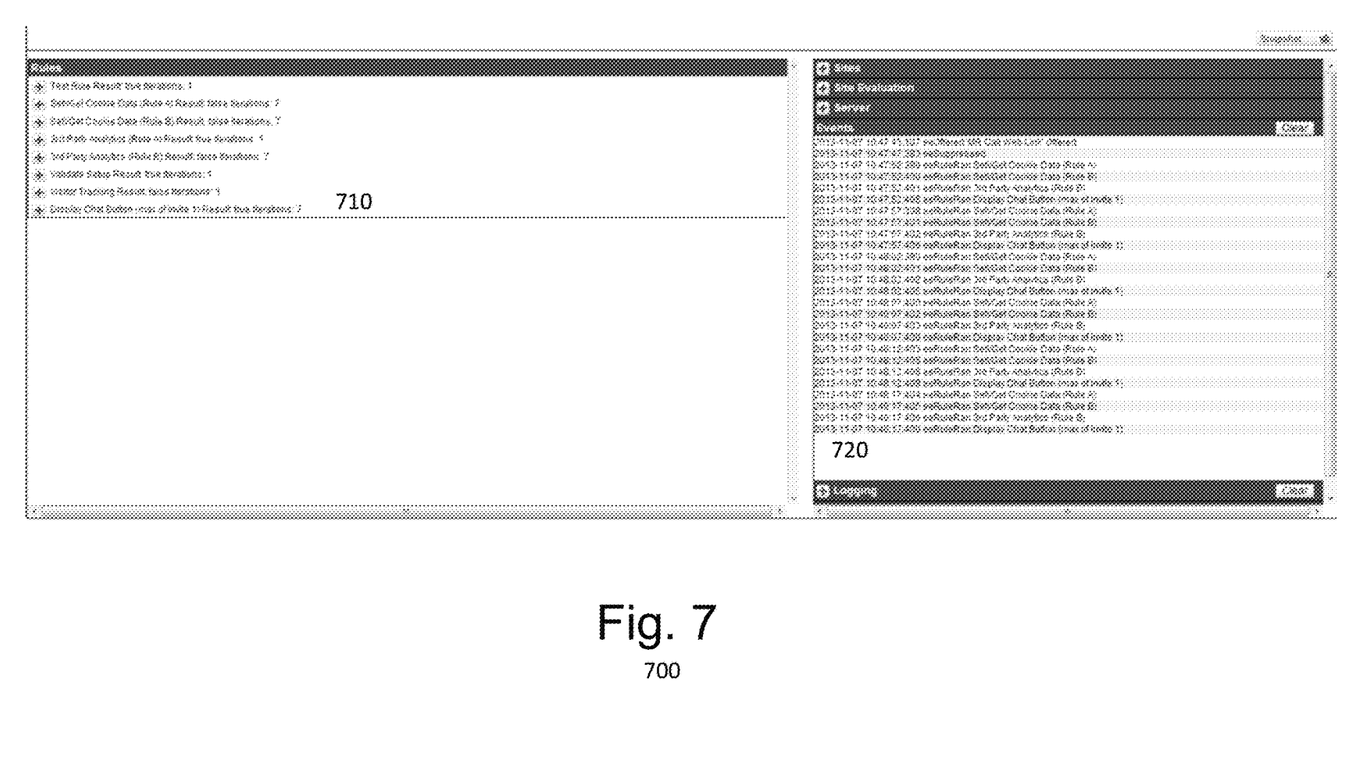
FIG. 7 illustrates another example graphical user interface of the debugging module according to an example embodiment of the present invention.

FIG. 7 illustrates another example graphical user interface 700 of the debugging module according to an example embodiment of the present invention. As shown in FIG. 7, section 710 includes a rules window, and section 720 depicts a number of compressed windows that may be expanded to provide further details about the execution of each rule and/or other activities of the secure debugging modules.

Figures 8A, 8B:
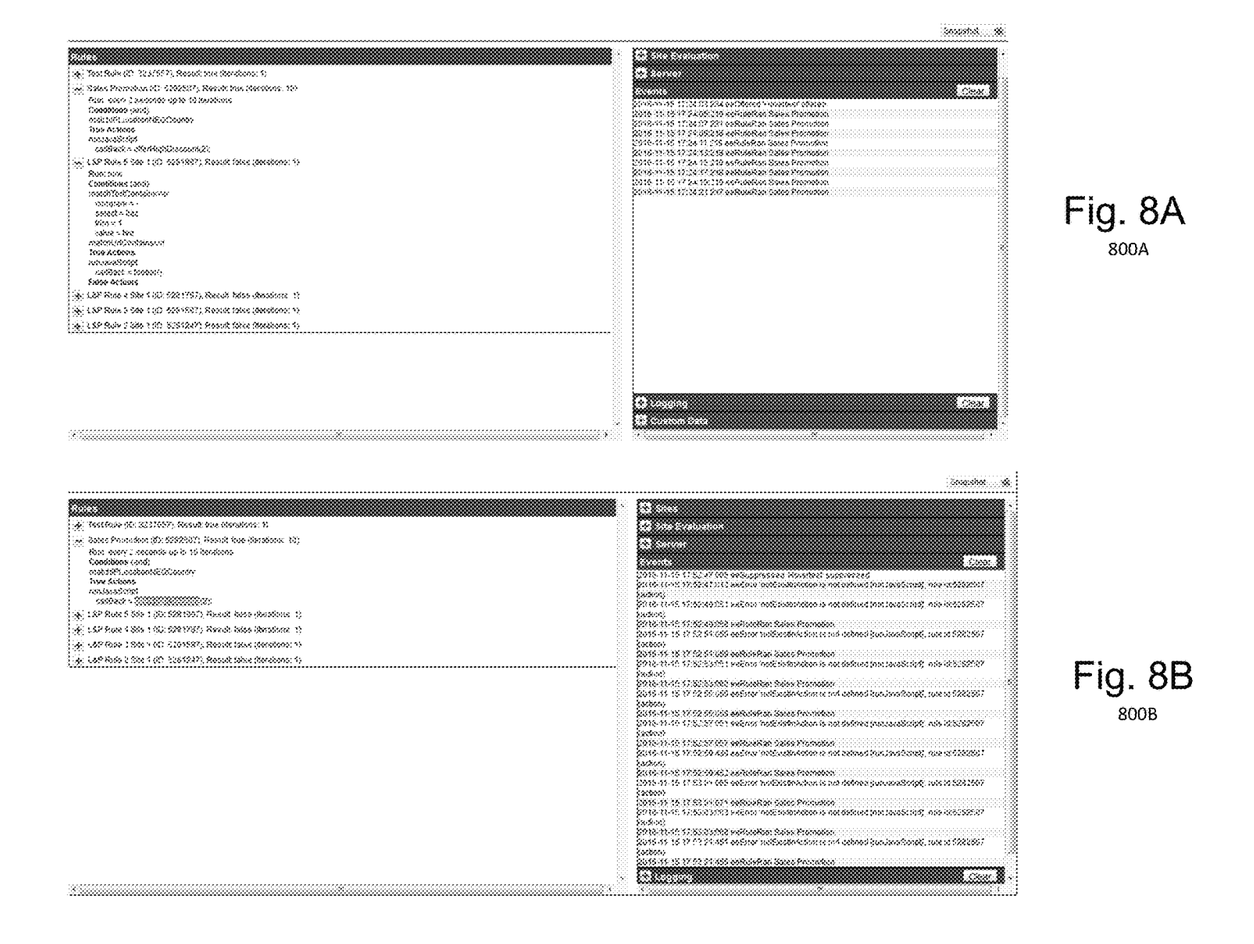
FIGS. 8A and 8B illustrate other example graphical user interfaces of the debugging module according to example embodiments of the present invention.

FIGS. 8A and 8B illustrate other example graphical user interfaces 800A, 800B of the secure debugging module according to example embodiments of the present invention. For example, FIG. 8A illustrates the rule "Sales Promotion (ID: 5282507)" iterating 10 times on the visitors page and evaluating as "true". Here, the true action is executing a JavaScript function called "offerHighDiscount(2)". This helps visualize the conditions and actions of a rule as it executes. In another example, FIG. 8B illustrates the case when the function "offerHighDiscount", called from the rule "Sales Promotion (ID: 5282507)" has a JavaScript error in it.

Thus, the rules system described herein secures each customers rule sets and business logic. Using the encrypted token, the rules system is secured so that customers cannot view the rule sets and business logic of other entities. In the various embodiments, the encrypted token may be encapsulated with a JavaScript that wraps the encrypted token so that it can be used as a sharable Internet cookie. When the user of the customer navigates between webpages, the encrypted token may be checked to ensure that the user does not navigate to another customer's webpage.

One having ordinary skill in the art will readily understand that the invention as discussed above may be practiced with steps in a different order, and/or with elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A method for debugging dynamically rendered content in a rules system, the method comprising:
defining a plurality of rules with a rules editor, wherein each rule includes a condition and an action, and wherein each action includes an instruction to render content within a webpage;
storing the plurality of rules in a datastore of the rules system;
generating at least one rule object based on the plurality of rules with a transformer, wherein the at least one rule object includes executable code;

storing the at least one rule object within an in-memory device disposed between a rules server and the transformer, wherein the rules server is a multi-tenant software as a service supporting multiple customers;

retrieving the at least one rule object by the rules server from the in-memory device by the rules server;

executing the retrieved at least one rule object by the rules server;

detecting an error during the execution of the rule object;

in response to a detection of the error, generating a request for an encrypted security token to access one or more rule debugging modules of the rules server; and providing the encrypted security token to a user who is one of the multiple customers, wherein the rules system allows the user to access the one or more rule debugging modules based on the encrypted security token while preventing the user from accessing rules of others of the multiple customers.

2. The method according to claim 1, wherein the encrypted security token is encapsulated as an Internet cookie.

3. The method according to claim 2, wherein the encrypted security token is encapsulated using a JavaScript.

4. The method according to claim 1, wherein the encrypted security token is shared between end users of a customer.

5. The method according to claim 1, wherein the encrypted security token includes account identification information and a time stamp.

6. The method according to claim 5, wherein the time stamp is configured to define a validity period for the encrypted security token.

7. The method according to claim 1, wherein the executable code comprises executable code of a compiled or a scripting programming language, and the rules server retrieves the at least one rule object without directly accessing the datastore.

8. A non-transitory computer readable storage medium storing one or more programs configured to be executed by a processor of a rules system, the one or more programs comprising instructions for:

defining a plurality of rules with a rules editor, wherein each rule includes a condition and an action, and wherein each action includes an instruction to render content within a webpage;

storing the plurality of rules in a datastore of the rules system;

generating at least one rule object based on the plurality of rules with a transformer, wherein the at least one rule object includes executable code;

storing the at least one rule object within an in-memory device disposed between a rules server and the transformer, wherein the rules server is a multi-tenant software as a service supporting multiple customers;

retrieving the at least one rule object by the rules server from the in-memory device by the rules server;

executing the retrieved at least one rule object by the rules server;

detecting an error during the execution of the rule object;

in response to a detection of the error, generating a request for an encrypted security token to access one or more rule debugging modules of the rules server; and providing the encrypted security token to a user who is one of the multiple customers, wherein the rules system allows the user to access the one or more rule debugging modules based on the encrypted security token while preventing the user from accessing rules of others of the multiple customers.

9. The non-transitory computer readable storage medium according to claim 8, wherein the encrypted security token is encapsulated as an Internet cookie.

10. The non-transitory computer readable storage medium according to claim 9, wherein the encrypted security token is encapsulated using a JavaScript.

11. The non-transitory computer readable storage medium according to claim 8, wherein the encrypted security token is shared between end users of a customer.

12. The non-transitory computer readable storage medium according to claim 8, wherein the encrypted security token includes account identification information and a time stamp.

13. The non-transitory computer readable storage medium according to claim 12, wherein the time stamp is configured to define a validity period for the encrypted security token.

14. The non-transitory computer readable storage medium according to claim 8, wherein the executable code comprises executable code of a compiled or a scripting programming language, and the rules server retrieves the at least one rule object without directly accessing the datastore.

15. A device of a rules system, the device comprising:

a processor; and a memory storing one or more programs for execution by the processor, the one or more programs including instructions for:

defining a plurality of rules with a rules editor, wherein each rule includes a condition and an action, and wherein each action includes an instruction to render content within a webpage;

storing the plurality of rules in a datastore of the rules system;

generating at least one rule object based on the plurality of rules with a transformer, wherein the at least one rule object includes executable code;

storing the at least one rule object within an in-memory device disposed between a rules server and the transformer, wherein the rules server is a multi-tenant software as a service supporting multiple customers;

retrieving the at least one rule object by the rules server from the in-memory device by the rules server;

executing the retrieved at least one rule object by the rules server;

detecting an error during the execution of the rule object;

in response to a detection of the error, generating a request for an encrypted security token to access one or more rule debugging modules of the rules server; and providing the encrypted security token to a user who is one of the multiple customers, wherein the rules system allows the user to access the one or more rule debugging modules based on the encrypted security token while preventing the user from accessing rules of others of the multiple customers.

16. The device according to claim 15, wherein the encrypted security token is encapsulated as an Internet cookie, and the rules server retrieves the at least one rule object without directly accessing the datastore.

17. The device according to claim 16, wherein the encrypted security token is encapsulated using a JavaScript.

18. The device according to claim 15, wherein the encrypted security token is shared between end users of a customer.

19. The device according to claim 15, wherein the encrypted security token includes account identification information and a time stamp.

20. The device according to claim 19, wherein the time stamp is configured to define a validity period for the encrypted security token.

* * * * *

UNITED STATES PATENT AND TRADEMARK OFFICE
CERTIFICATE OF CORRECTION

PATENT NO. : 10,268,536 B2  
APPLICATION NO. : 15/364991  
DATED : April 23, 2019  
INVENTOR(S) : McCarry Page 1 of 1

It is certified that error appears in the above-identified patent and that said Letters Patent is hereby corrected as shown below:

In the Drawings

On sheet 5 of 8, in Fig. 5, under Reference Numeral 520, Line 2, delete "retreived" and insert -- retrieved --, therefor.

In the Specification

In Column 2, Line 65, delete "and or" and insert -- and/or --.

Signed and Sealed this  
Fourth Day of August, 2020

Andrei Iancu  
*Director of the United States Patent and Trademark Office*